(12) United States Patent
Xiao et al.

(10) Patent No.: US 8,977,632 B2
(45) Date of Patent: *Mar. 10, 2015

(54) TRAVELOGUE LOCATING MINING FOR TRAVEL SUGGESTION

(75) Inventors: Rong Xiao, Beijing (CN); Jiangming Yang, Beijing (CN); Lei Zhang, Beijing (CN); Xingrong Chen, Macau (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 641 days.

This patent is subject to a terminal disclaimer.

(21) Appl. No.: 12/568,749

(22) Filed: Sep. 29, 2009

(65) Prior Publication Data

US 2011/0078139 A1    Mar. 31, 2011

(51) Int. Cl.
*G06F 17/30* (2006.01)

(52) U.S. Cl.
CPC ...... *G06F 17/30241* (2013.01); *G06F 17/3087* (2013.01); *Y10S 707/919* (2013.01)
USPC ...... 707/750; 707/E17.08; 707/919

(58) Field of Classification Search
USPC ............ 707/918, 776, 750, 919, E17.08; 715/738
See application file for complete search history.

(56) References Cited

U.S. PATENT DOCUMENTS

| | | | |
|---|---|---|---|
| 6,182,008 B1 | 1/2001 | Nikiel et al. | |
| 6,321,158 B1 | 11/2001 | DeLorme et al. | |
| 7,379,811 B2 | 5/2008 | Rasmussen et al. | |
| 7,463,976 B2 | 12/2008 | Nomura | |
| 7,472,338 B2 | 12/2008 | Carro | |
| 7,475,010 B2 | 1/2009 | Chao | |
| 7,548,915 B2 | 6/2009 | Ramer et al. | |
| 7,698,332 B2 | 4/2010 | Liu et al. | |
| 7,734,641 B2 | 6/2010 | Kanigsberg | |
| 7,788,134 B1 | 8/2010 | Manber et al. | |
| 7,826,965 B2 | 11/2010 | Sadri et al. | |
| 8,095,303 B1 | 1/2012 | Nesbilt et al. | |
| 8,275,546 B2 * | 9/2012 | Xiao et al. | 701/533 |
| 8,281,246 B2 * | 10/2012 | Xiao et al. | 715/738 |
| 2002/0128767 A1 | 9/2002 | Cardno et al. | |
| 2002/0143490 A1 | 10/2002 | Maeda et al. | |
| 2003/0093217 A1 | 5/2003 | Petzold et al. | |
| 2004/0059708 A1 | 3/2004 | Dean et al. | |
| 2005/0216464 A1 | 9/2005 | Toyama et al. | |
| 2005/0234991 A1 | 10/2005 | Marx et al. | |
| 2005/0278378 A1 | 12/2005 | Frank | |
| 2006/0047690 A1 | 3/2006 | Humphreys et al. | |

(Continued)

OTHER PUBLICATIONS

Free Geography Tools, Jul. 19, 2007, pp. 1-10.*

(Continued)

*Primary Examiner* — Albert Phillips, III
(74) *Attorney, Agent, or Firm* — Dan Choi; Judy Yee; Micky Minhas (57) ABSTRACT

A location extraction component analyzes a set of travelogues to identify all of the locations mentioned therein. A co-occurrence extraction component computes co-occurrence values for the identified locations. When the identity of a specified location is received, suggested locations for the specified location are identified through the use of the co-occurrence values. A map is displayed that encompasses an area including the specified location and the suggested locations. The map might include indicators for the specified location and for each of the suggested locations. Attributes of the indicators, such as their size or color, can be modified based upon the co-occurrence value associated with the corresponding suggested location.

15 Claims, 7 Drawing Sheets

(56) References Cited

U.S. PATENT DOCUMENTS

| | | | |
|---|---|---|---|
| 2006/0230033 A1 | 10/2006 | Halevy et al. | |
| 2007/0005419 A1 | 1/2007 | Horvitz et al. | |
| 2007/0010942 A1 | 1/2007 | Bill | |
| 2007/0150188 A1 | 6/2007 | Rosenberg | |
| 2007/0179863 A1 | 8/2007 | Stoll | |
| 2007/0198182 A1 | 8/2007 | Singh | |
| 2007/0219968 A1 | 9/2007 | Frank | |
| 2008/0010605 A1* | 1/2008 | Frank | 715/765 |
| 2008/0033903 A1 | 2/2008 | Carol et al. | |
| 2008/0082578 A1 | 4/2008 | Hogue et al. | |
| 2008/0086468 A1 | 4/2008 | Jing et al. | |
| 2008/0086686 A1 | 4/2008 | Jing et al. | |
| 2008/0125969 A1 | 5/2008 | Chen et al. | |
| 2008/0319974 A1 | 12/2008 | Ma et al. | |
| 2009/0005981 A1 | 1/2009 | Forstall et al. | |
| 2009/0019066 A1 | 1/2009 | Wang et al. | |
| 2009/0070297 A1 | 3/2009 | Hadzima et al. | |
| 2009/0119255 A1 | 5/2009 | Frank et al. | |
| 2009/0156229 A1 | 6/2009 | Hein et al. | |
| 2009/0303036 A1 | 12/2009 | Sahuguet | |
| 2010/0179754 A1 | 7/2010 | Faenger et al. | |
| 2011/0072025 A1 | 3/2011 | van Zwol et al. | |
| 2011/0077848 A1 | 3/2011 | Xiao et al. | |
| 2011/0078575 A1 | 3/2011 | Xiao et al. | |
| 2011/0145235 A1 | 6/2011 | Lei et al. | |
| 2011/0252025 A1 | 10/2011 | Jin et al. | |
| 2011/0264655 A1 | 10/2011 | Xiao et al. | |
| 2011/0264664 A1 | 10/2011 | Xiao et al. | |
| 2011/0271232 A1 | 11/2011 | Crochet et al. | |

OTHER PUBLICATIONS

Moxley, SpiritTagger: A Geo-Aware Tag Suggestion Tool Mined from Flickr, 2008, pp. 24-30.*

Ricci, ITR: A Case-Based Travel Advisory System, 2002, pp. 613-627.*

Zheng, et al., "Mining Interesting Locations and Travel Sequences from GPS Trajectories—Published Date: Apr. 20-24, 2009", Retrieved at <<http://www2009.eprints.org/80/1/p791.pdf>>, Apr. 20-24, 2009, Madrid, Spain, pp. 791-800.

Ricci, Francesco, "Travel Recommender Systems—Published Date: Nov./Dec. 2002", Retrieved at <<http://www.inf.unibzit/~ricci/papers/RicciIEEEIntSys.pdf>>, Nov./Dec. 2002, IEEE Intelligent Systems, pp. 55-57.

Martens, Axel, "On Usability of Web Services—Published Date: Dec. 13, 2003", Retrieved at <<http://www2.informatik.hu-berlin.de/top/download/publications/Martens2003_wqw.pdf>>, Dec. 13, 2003, Germany, pp. 11.

"Microsoft Streets & Trips 2001 Planning a Road Trip", Retrieved at <<http://www.webjunction.org/c/document_library/get_file?folderId=431408&name=DLFE-10121.pdf>>, 2001, pp. 147-154.

Amitay, et al., "Web-A-Where: Geotagging Web Content", Retrieved at <<http://einat.webir.org/SIGIR_2004_GeoMiner_p273-amitay.pdf>>, Proceedings of the 27th annual international ACM SIGIR conference on Research and development in information retrieval, Jul. 25-29, 2004, Sheffield, South Yorkshire, UK., pp. 273-280.

"Bootsnall", Retrieved at <<http://www.bootsnall.com>>, Aug. 7, 2009, pp. 1-2.

"Expedia", Retrieved at <<http://www.expedia.com>>, Expedia Travel: Cheap Flights, Hotels, Car Rental, Airfare, Cruise, and Vacations, Aug. 7, 2009, pp. 1-2.

"Getjealous", Retrieved at <<http://www.getjealous.com>>, GetJealous.com Travel Blogs, Aug. 7, 2009, pp. 1-2.

Leidner,et al., "Grounding Spatial Named Entities for Information Extraction and Question Answering" Retrieved at <<http://citeseerx.ist.psu.edu/viewdoc/download?doi=10.1.1.4.3786&rep=rep1&type=pdf>>, In the Proceedings of the HLT-NAACL 2003 workshop on Analysis of geographic references—vol. 1, 2003, pp. 8.

Li, et al. "Location Normalization for Information Extraction", Retrieved at <<http://www.aclweb.org/anthology/C/CO2/CO2-1127.pdf>> In the Proceedings of the 19th international conference on Computational linguistics,2002, pp. 7.

Li, et al., "Infoxtract Location Normalization: A Hybrid Approach to Geographic References in Information Extraction", Retrieved at <<http://acl.ldc.upenn.edu/W/W03/W03-0106.pdf>>, In the Proceedings of the HLT-NAACL 2003 workshop on Analysis of geographic references—vol. 1, 2003, pp. 6.

Ma, et al., "A Localness-Filter for Searched Web Pages", Retrieved at <<http://www.springerlink.com/content/pkm5r1yv1jd2hw7m/fulltext.pdf>>, X. Zhou,Y. Zhang, and M.E. Orlowska (Eds.): APWeb 2003, LNCS 2642, pp. 525-536, 2003, vol. 2642, 2003, pp. 525-536.

McCurley, Kevin S., "Geospatial Mapping and Navigation of the Web", Retrieved at <<http://delivery.acm.org/10.1145/380000/372056/p221-mccurley.pdf?key1=372056&key2=2726369421&coll=GUIDE&dl=GUIDE&CFID=46700166&CFTOKEN=58855283>>, In the Proceedings of the 10th international conference on World Wide Web, May 1-5, 2001, Hong Kong, pp. 221-229.

Rauch, et al., "A Confidence-Based Framework for Disambiguating Geographic Terms", Retrieved at <<http://delivery.acm.org/10.1145/1120000/1119402/p50-rauch.pdf?key1=1119402&key2=9416369421&coll=GUIDE&dl=GUIDE&CFID=46700009&CFTOKEN=96529354>>, In the Proceedings of the HLT-NAACL 2003 workshop on Analysis of geographic references, 2003, pp. 50-54.

"Realtravel", Retrieved at <<http://www.realtravel.com>>, Travel reviews & deals for vacations, hotels, resorts—Real Travel, Aug. 7, 2009, pp. 1-3.

"Travelblog", Retrieved at <<http://www.travelblog.org>>, Travel Blogs, Photos, Videos and Maps, Aug. 7, 2009, pp. 1-4.

"Traveljournals", Retrieved at <<http://www.traveljournals.net>>, Traveljournals.net—Stories from your friends on the road, Aug. 7, 2009, p. 1.

"Travelpod", Retrieved at <<http://www.travelpod.com>>, Free Travel Blog to Share your Trips—TravelPod, Aug. 7, 2009, pp. 1-4.

"Travelpost", Retrieved at <<http://www.travelpost.com>>, Hotel Reviews | Hotel Ratings | Resort Reviews = TravelPost.com, Aug. 7, 2009, p. 1.

Wang, et al., "Detecting Geographic Locations from Web Resources", Retrieved at <<http://delivery.acm.org/10.1145/1100000/1096991/p17-wang.pdf?key1=1096991&key2=5065369421&coll=GUIDE&dl=GUIDE&CFID=47917983&CFTOKEN=38473394>> Proceedings of the 2005 workshop on Geographic information retrieval, 2005, pp. 17-24.

Wang, et al., "Web Resource Geographic Location Classification and Detection", Retrieved at <<http://www2005.org/cdrom/docs/p1138.pdf>>, Special interest tracks and posters of the 14th international conference, May 10-14, 2005, pp. 1138-1139.

"Yahoo Place maker", <<developer.yahoo.com/geo/placemaker>>, Pages 2.

U.S. Notice of Allowance dated May 23, 2012 in U.S. Appl. No. 12/568,725.

U.S. Official Action dated Dec. 19, 2011 in U.S. Appl. No. 12/568,735.

U.S. Notice of Allowance dated May 23, 2012 in U.S. Appl. No. 12/568,735.

U.S. Official Action dated Feb. 29, 2012 in U.S. Appl. No. 12/764,989.

U.S. Official Action dated Mar. 30, 2012 in U.S. Appl. No. 12/764,977.

U.S. Official Action dated Aug. 15, 2012 in U.S. Appl. No. 12/764,977.

"Embed Google Maps on your Website or Blog," Sep. 5, 2007, Retrieved from http://www.labnol.org/internet/blogging/embed-google-maps-on-your-website-or-blog/1316/, 1 page.

"Geographic Information System," Wikipedia, Retrieved Aug. 6, 2009 from http://en.wikipedia.org/wiki/GIS, 18 pages.

"GeoSense Mobility Complete Mobile Workforce Management Platform," Retrieved Aug. 11, 2009 from http://enovia.ca/site/GeoSenseMobility.php, pp. 3.

(56) References Cited

OTHER PUBLICATIONS

"Inserting HTML Code into your Web Site, " Retrieved Aug. 11, 2009 from http://office.microsoft.com/en-us/officelive/FX102223081033.aspx?mode=print, 6 pages.

"Road Trip," Retrieved Aug. 6, 2009 from http://download.microsoft.com/download/2/4/b/24bb8c05-8bd4-4cac-89ff-0901bf3b8468/RoadTrip.doc, 1 Page.

"Shortest Path Problem," Wikipedia, Retrieved Aug. 7, 2009 from http://en.wikipedia.org/wiki/Shortest_path, 4 pages.

"Travelogue," Retrieved Aug. 6, 2009 from http://sourceforge.net/projects/travelogue/, 1 page.

"Travelling Salesman Problem," Wikipedia, Retrieved Aug. 7, 2009 from http://en.wikipedia.org/wiki/Traveling_salesman_problem, 8 pages.

"Web User Experience," Retrieved Aug. 11, 2009 from http://research.microsoft.com/en-us/projects/wue/, 2 pages.

Brunato et al., "A Location-dependent Recommender System for the Web," 2002, *Technical Report DIT-02-093, Ingengneria e Scienca dell'Informazione*, University of Trento, Italy, 5 pages.

Cucerzan, "Large-scale Named Entity Disambiguation Based on Wikipedia Data," Jun. 2007, Proceedings of the 2007 *Joint Conf. on Empirical Methods in Natural Language Processing and Computational Natural Language Learning*, pp. 708-716.

Ardissono et al. "Tailoring the Recommendation of Tourist Information to Heterogeneous User Groups," 2002, *Proceedings, Revised Papers from the International Workshops OHS-7, SC-3, and AH-3 on Hypermedia: Openness, Structural Awareness, and Adaptivity*, pp. 280-295.

Hassell, IV "Ontology-driven Automatic Entity Disambiguation in Unstructured Text," 2006, Thesis, University of Georgia, 96 pages.

Jing et al., "VirtualTour: An Online Travel Assistant Based on High Quality Images," Oct. 23-27, 2006, MM'06, SantaBarara, California, 4 pages.

Mior, "Rapid Prototyping of a Mobile Location-based Tour," Dec. 12, 2008, Thesis, University of Ontario Institute of Technology, 22 pages.

Overell et al., "Geographic Co-occurrence as a Tool for GIR," Nov. 9, 2007, *ACM*, 6 pages.

Park et al., "Location-based Recommendation System Using Bayesian User's Preference Model in Mobile Devices," 2007, *Lecture Notes in Computer Science*, vol. 4611/2007, Pp. 1130-1139.

Pouliquen et al., "Geographical Recognition and Visualization in Texts Written in Various Languages," Mar. 14-17, 2004, *ACM Symposium on Applied Computing*, 8 pages.

Rogers, et al., a"An Adaptive Interactive Agent for Route Advice," 1999, *Proceedings of the third annual conference on Autonomous Agents*, pp. 198-205.

Silvia et al., "Adding Geographic Scopes to Web Resources," 2004, *Workshop on Geographic Information Retrieval*, Sheffield, UK, 3 pages.

Sundheim, "Resources to Facilitate Progress in Place Name Identification and Reference Resolution," 2002, Proceedings of the 2nd Int'l Conference on Human Language Technology Research, pp. 319-324.

Takeuchi et al., "An Outdoor Recommendation System based on User Location History," 2005, ubiPCMM, 10 pages.

Wang et al., "Application-Driven Web Resource Location Classification and Detection," Mar. 2005, retrieved from http://research.microsoft.com/pubs/70152/tr-2005-32.pdf, 10 pages.

Wang et al., "Detecting Dominant Locations from Search Queries," 2005, *Proceeding of SIGR Conference on Research and Development in Information Retrieval*, pp. 424-431.

U.S. Official Action dated Oct. 24, 2012 in U.S. Appl. No. 12/764,989. Pages 1-17.

U.S. Official Action dated Feb. 26, 2013 in U.S. Appl. No. 12/764,977. Pages 1-15.

U.S. Official Action dated Apr. 4, 2013 in U.S. Appl. No. 12/764,989, pp. 1-11.

U.S. Notice of Allowance dated Jun. 25, 2013 in U.S. Appl. No. 12/764,977. Pages 1-15.

U.S. Notice of Allowance dated Oct. 25, 2013 in U.S. Appl. No. 12/764,989. Pages 1-23.

* cited by examiner

TRAVELOGUE LOCATING MINING FOR TRAVEL SUGGESTION

BACKGROUND

Travelogues are textual descriptions of a person's experience with a particular location. For instance, a person might travel to New York City and write a travelogue that describes their travel experience. In addition to a description of the person's travel experience with a particular location, a travelogue might also include a description of the person's experience with other, related locations. For instance, a travelogue regarding New York City might also include information regarding other nearby locations, like Brooklyn. Such a travelogue might also include information regarding tourist attractions, restaurants, shopping destinations, and other locations in or near New York City.

Travelogues are currently written and shared in a variety of different ways on the Internet. For instance, travelogues can be shared by way of World Wide Web (the "Web") sites, Web forums, blog sites, social networking sites, and in myriad other ways. A large number of such sites are currently available on the Internet for writing and sharing travelogues. Such a large number of disparate sites containing travelogues can make it very difficult, however, for users to identify locations of particular interest with respect to a given travel destination. For instance, a person that plans to travel to New York City in the future may have a difficult time identifying locations of interest due to the sheer volume of sites that contain travelogues.

It is with respect to these and other considerations that the disclosure made herein is presented.

SUMMARY

Concepts and technologies are described herein for travelogue-based travel suggestion. Through an implementation of the concepts and technologies presented herein, functionality can be provided for assisting a user in identifying locations of interest relevant to a user-specified location. For instance, suggested locations in or near New York City may be provided to a user in response to a search for information regarding New York City. In this manner, the user does not have to search a large number of travelogue sites in order to find locations of particular interest with respect to a specific travel destination.

According to one aspect presented herein, travelogues are retrieved from a variety of travelogue sites and stored. For instance, travelogues might be retrieved from Web sites, Web forums, blog sites, social networking sites, and other types of sites. As discussed above, a travelogue is a text description of an experience with a location. Travelogues might also include a text description of an experience with other, related locations, such as nearby geographical locations, tourist attractions, restaurants, shopping destinations, and other types of locations.

Once the travelogues have been obtained and stored, a location extraction component is executed that analyzes the travelogues to identify all of the locations mentioned therein. The location extraction component might utilize a gazetteer containing location names in order to identify the locations mentioned in the set of travelogues. For instance, the gazetteer might be utilized to identify possible name candidates, a classifier might then be utilized to identify location names from the candidates, and ambiguity resolution might then be performed to distinguish between different locations that have the same name.

After the locations mentioned in the set of travelogues have been identified, a co-occurrence extraction component is executed that computes co-occurrence values for the identified locations. Each co-occurrence value is an integer value that specifies the number of times two locations are mentioned in the same travelogue for the entire set of travelogues. Co-occurrence values are, therefore, computed for pairs of identified locations. The co-occurrence values are then stored for use in identifying suggested locations.

When the identity of a specified location is received, such as through the submission of the identity of a location to a search Web site, suggested locations for the specified location are identified through the use of the co-occurrence values. In particular, the co-occurrence values are searched in order to identify those other locations that have non-zero co-occurrence values with respect to the specified location. The other locations having non-zero co-occurrence values with respect to the specified location can then be displayed to a user as suggested locations. In one embodiment, only those other locations having the highest co-occurrence values with respect to the specified location may be displayed.

In one embodiment, a map is displayed to the user that encompasses an area including the specified location and the suggested locations. Indicators might be displayed on the map for the specified location and for each of the suggested locations. In one embodiment, attributes of the indicators, such as their size or color, are modified based upon the co-occurrence value associated with the corresponding suggested location. In another embodiment, lines are displayed between the indicator for the specified location and the indicators for the suggested locations. Attributes of the lines, such as their thickness or style, might also be modified based upon the co-occurrence value associated with the corresponding suggested location.

It should be appreciated that the above-described subject matter might also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for travelogue-based travel suggestion. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for travelogue-based travel suggestion will be presented.

Figure 1:
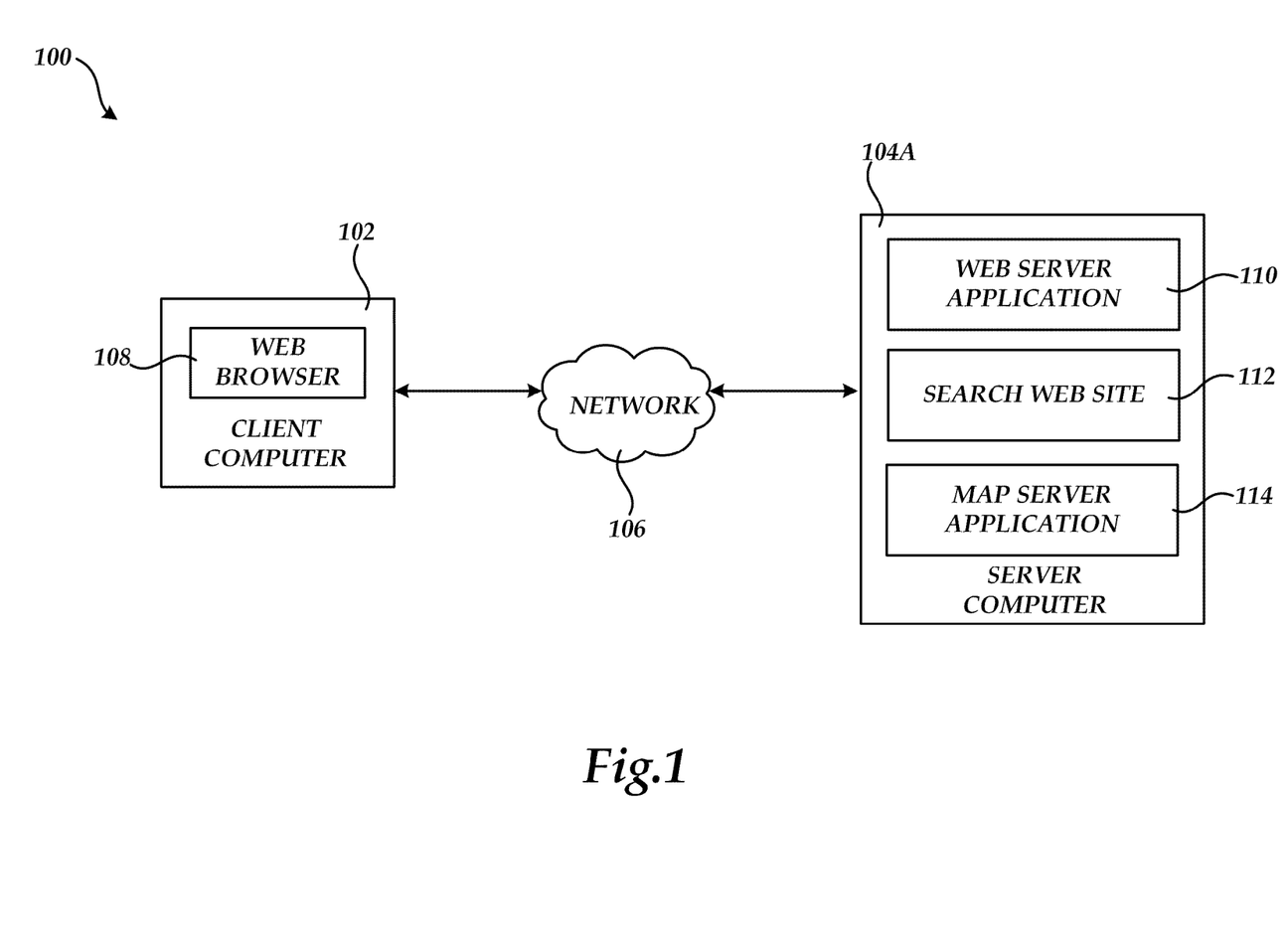
FIGS. 1 and 2 are system diagrams illustrating aspects of one operating environment for the various embodiments presented herein.

Referring now to FIG. 1, aspects of one operating environment for the various embodiments presented herein will be described. In particular, FIG. 1 shows a system 100 that provides an operating environment for the various embodiments presented herein. As illustrated in FIG. 1, the system 100 includes a client computer 102 and a server computer 104A that are coupled via a network 106. In the embodiments presented herein, the network 106 comprises the Internet. It should be appreciated, however, that other types of local and wide area networks may be utilized to interconnect the client computer 102 and the server computer 104A. It should also be appreciated that although a single client computer 102 and a single server computer 104A have been illustrated in FIG. 1, many such client computers 102 may be utilized in conjunction with the functionality presented herein and many server computers 104A may be utilized to provide the functionality described herein. In this regard, it should be appreciated that the software components described herein for providing travelogue-based travel suggestions may be executed in a distributed fashion among many such server computers 104 interconnected by many such networks 106.

According to one implementation, the server computer 104A is configured to execute a Web server application 110. As known in the art, a Web server application 110 is configured to receive and respond to requests for Web sites, such as the search Web site 112.

According to one implementation, the search Web site 112 is configured to provide the functionality presented herein for travelogue-based travel suggestions. In particular, a user of the client computer 102 may utilize the Web browser 108 to establish a connection with the Web server application 110 and to connect to the search Web site 112. According to one implementation, the search Web site 112 is configured to receive a search query from the user of the client computer 102 via the Web browser 108. The search query might include the identity of a specified location. For instance, the user of the client computer 102 may request that the search Web site 112 search for "Orlando, Fla."

In response to receiving a search request, the search Web site 112 presented herein is configured to perform a Web search for information corresponding to the specified search terms. Additionally, in one embodiment presented herein, the search Web site 112 is further configured to identify to the user of the client computer 102 information regarding other suggested locations relevant to the location specified by the user. For instance, in response to a search for "Orlando, Fla.", the search Web site 112 may provide a listing of suggested locations, including, Cape Canaveral, Daytona Beach, Miami, Tampa, and Tallahassee, Fla. Details regarding the processing performed by the search Web site 112 in order to provide this functionality will be provided below with respect to FIGS. 2-8.

According to one implementation, the search Web site 112 operates in conjunction with a map server application 114 to provide a map showing the location specified by the user and any suggested locations. In particular, the search Web site 112 may operate in conjunction with a map server application 114 to cause the Web browser 108 to display a map to a user of the client computer 102. The map shows a geographical area including the specified location and any suggested locations identified by the search Web site 112. As discussed in greater detail below, the map may also be configured to indicate to a user of the client computer 102 the relevance, or popularity, of the suggested locations with respect to the specified locations. Additional details regarding this functionality will also be provided below with respect to FIGS. 2-8.

Figure 2:
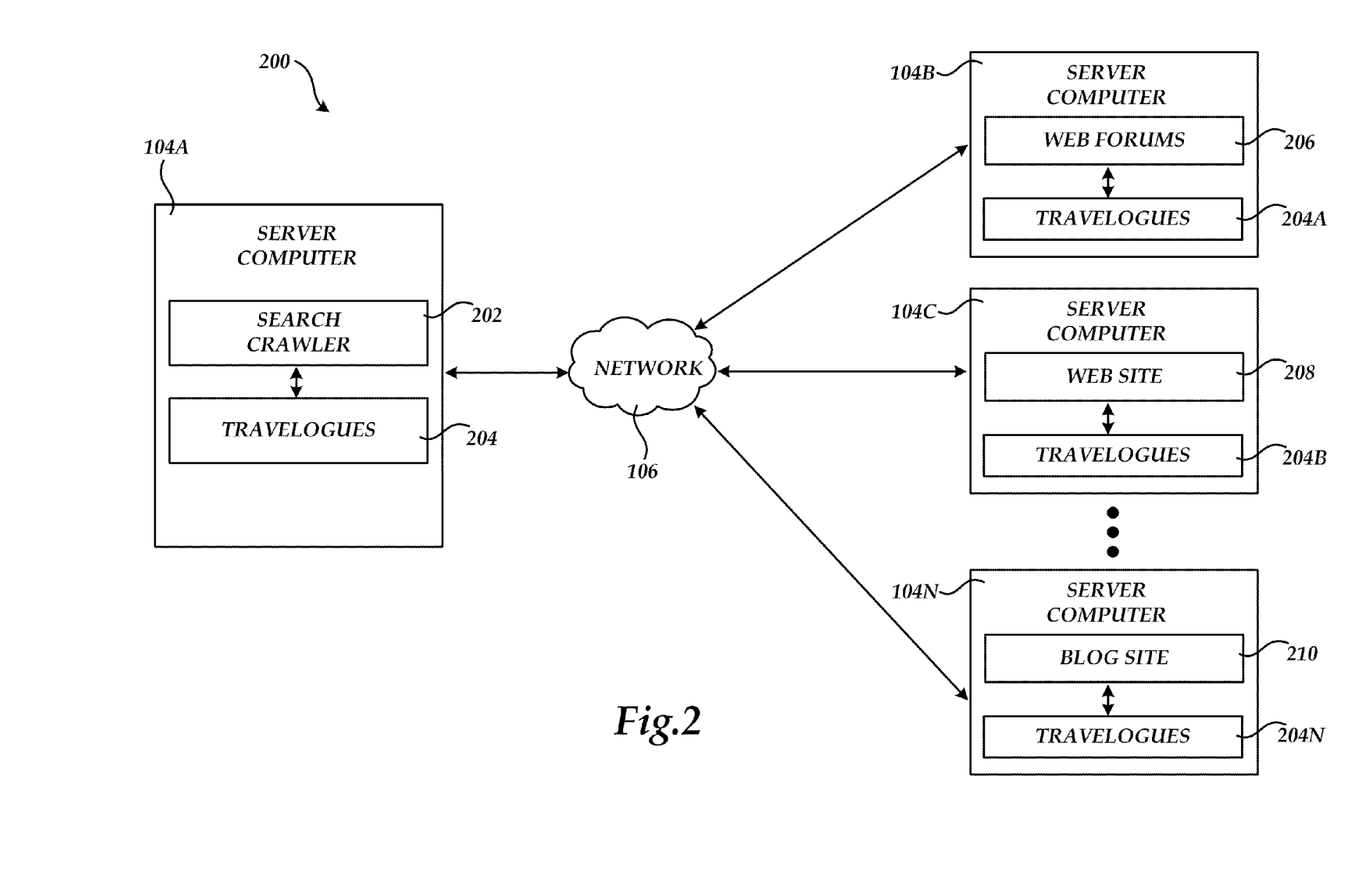

Turning now to FIG. 2, additional aspects of one operating environment for the various embodiments presented herein will be disclosed. As shown in FIG. 2, the server computer 104A may be equipped with a search crawler program 202 that is configured to retrieve information from the server computers 104B-104N. In particular, the search crawler 202 is configured to crawl sites publically available from the server computers 104B-104N that include travelogues 204A-204N. As discussed briefly above, travelogues are textual descriptions of a person's experience with a particular location. For instance, a person might travel to New York City and write a travelogue that describes their travel experience. In addition to a description of a person's travel experience with a particular location, a travelogue might also include a description of the person's experience with other, related locations. For instance, a travelogue regarding New York City might also include information regarding other nearby locations like Brooklyn. Such a travelogue might also include information regarding tourist attractions, restaurants, shopping destinations, and other locations in or near New York City.

As known to those skilled in art, travelogues are currently written and shared in a variety of different ways on the Internet. For instance, travelogues can be shared by way of a Web site 208, Web forums 206, a blog site 210, social networking sites, and through the use of other sites made publically available via a network 106, such as the Internet. The search crawler 202 is configured in one embodiment to crawl the Web forms 206, the Web site 208, and the blog site 210 to identify and retrieve the travelogues 204A-204N, respectively (the travelogues 204A-204N are referred to herein collectively as the travelogues 204).

The search crawler 202 then stores all or portion of the travelogues 204 at the server computer 104A. As will be discussed in greater detail below, the content of the travelogues 204 can be utilized by the search Web site 112 to provide travel suggestions to a user of the client computer 102. Additional details regarding this process will be provided below with respect to FIGS. 3-8.

Figure 3:
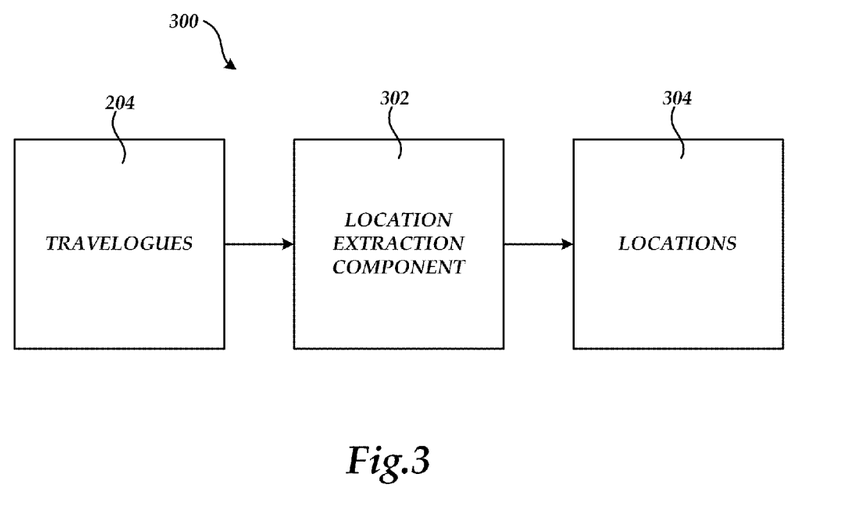
FIG. 3 is a software architecture diagram showing aspects of a software component utilized in one embodiment presented herein for extracting locations from travelogues.

Referring now to FIG. 3, a software architecture diagram showing aspects of one software component utilized in an embodiment presented herein for extracting locations from travelogues will be described. In particular, FIG. 3 illustrates a location extraction component 302 that might be executed by the server computer 104 according to various embodiments presented herein. The location extraction component 302 is an executable software component configured to take the travelogues 204 as input. The location extraction component 302 then analyzes the travelogues 204 to identify all of the locations 304 mentioned therein. For instance, if one of the travelogues 204 referenced New York City, Brooklyn, Manhattan, Wall Street, and Central Park, the location extraction component 302 would be able to identify these locations 304 through an analysis of the travelogue.

In order to identify locations in the travelogues 204, the location extraction component 302 might utilize a gazetteer that contains location names in order to identify the locations mentioned in the set of travelogues 204. For instance, the gazetteer might be utilized to identify possible name candidates, a classifier might then be utilized to identify location names from the candidates, and ambiguity resolution might then be performed to distinguish between different locations that have the same name.

Figure 4:
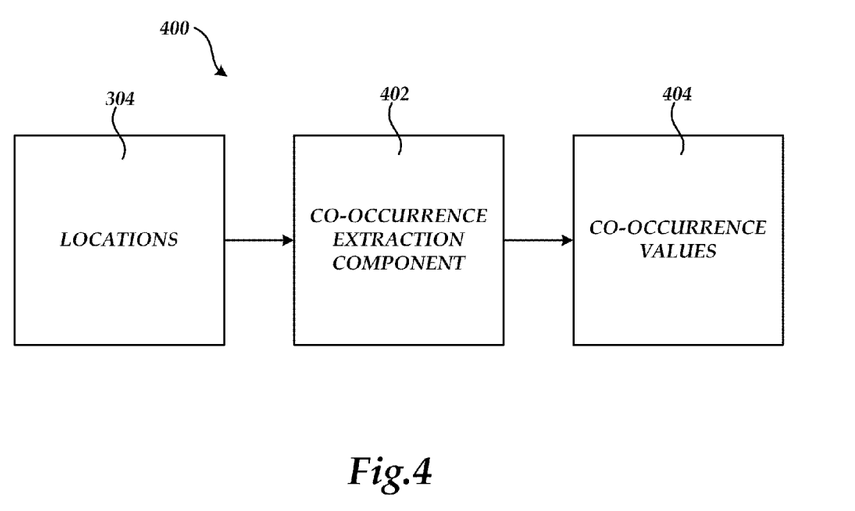
FIG. 4 is a software architecture diagram showing aspects of a software component utilized in one embodiment presented herein for generating co-occurrence values for locations identified in travelogues.

Turning now to FIG. 4, a software architecture diagram showing aspects of a software component utilized in one embodiment presented herein for generating co-occurrence values for locations identified in travelogues will be described. In particular, FIG. 4 illustrates a co-occurrence extraction component 402. The co-occurrence extraction component 402 is also an executable software component that might be utilized by the server computer 104A to provide the functionality described herein for providing travelogue-based travel suggestions to a user of the client computer 102.

As illustrated in FIG. 4, the co-occurrence extraction component 402 takes the locations 304 generated by the location extraction component 302 as input. The co-occurrence extraction component 402 then computes co-occurrence values for the identified locations 304. A co-occurrence value is an integer value that specifies the number of times two locations are mentioned in the same travelogue for the entire set of travelogues 204. In order to compute the co-occurrence value, the number of times each pair of locations 304 occurs within the entire set of travelogues 204 is computed by the co-occurrence extraction component 402. The co-occurrence values 404 are then stored for use in identifying suggested travel locations to a user of the client computer 102 in the manner described below.

As will be described in greater detail below, when the identity of a specified location is received, such as through the submission of the identity of the location to the search Web site 112, suggested locations for the specified location are identified through the use of the co-occurrence values 404. In particular, the occurrence values 404 are searched in order to identify those other locations that have the non-zero co-occurrence values with respect to the specified location. The other locations having non-zero co-occurrence values with respect to the specified location can then be displayed to a user. In one embodiment, the top locations having the largest co-occurrence values may be displayed. For instance, the top N locations having the largest co-occurrence values may be displayed to a user. Additional details regarding this process will be provided below with respect to FIGS. 5-8.

Figure 5:
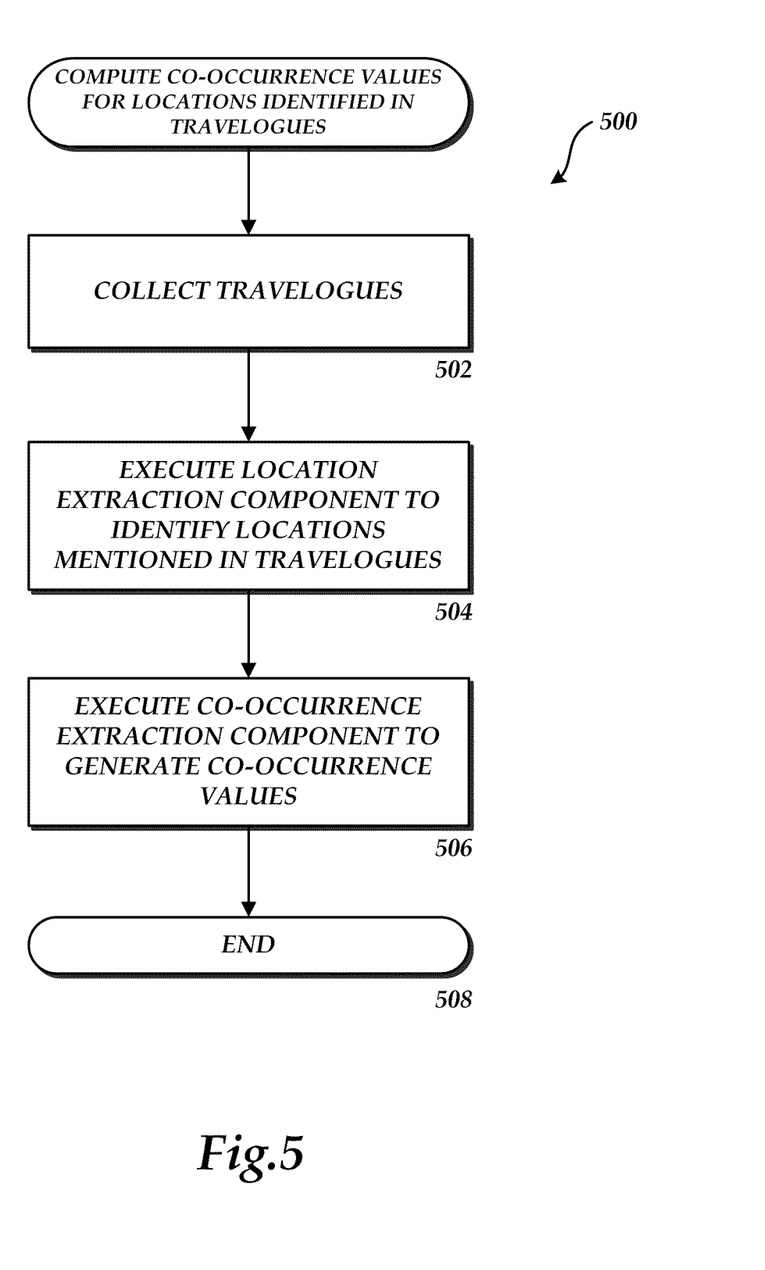
FIG. 5 is a flow diagram showing aspects of one process presented herein for generating co-occurrence values for locations identified in travelogues according to one embodiment presented herein.

Referring now to FIG. 5, additional details will be provided regarding the embodiments presented herein for travelogue-based travel suggestion. In particular, FIG. 5 is a flow diagram showing a routine 500 that illustrates aspects of one process presented herein for generating co-occurrence values for locations identified in travelogues.

It should be appreciated that the logical operations described herein with respect to FIG. 5 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the search crawler 202 collects the travelogues 204 from the server computer 104B-104N. Once the travelogues 204 have been collected, the routine 500 proceeds to operation 504 where the location extraction component 302 is executed. As discussed above, the location extraction component 302 is configured to identify locations 304 that are mentioned in the set of travelogues 204.

Once the location extraction component 302 has completed execution, the routine 500 proceeds to operation 506, where the co-occurrence extraction component 402 is executed. As discussed above with respect to FIG. 4, the co-occurrence extraction component 402 is configured to generate co-occurrence values 404 for each pair of locations 304 identified within the travelogues 204. Once the co-occurrence extraction component 402 has completed execution, the routine 500 proceeds to operation 508, where it ends.

Figure 6:
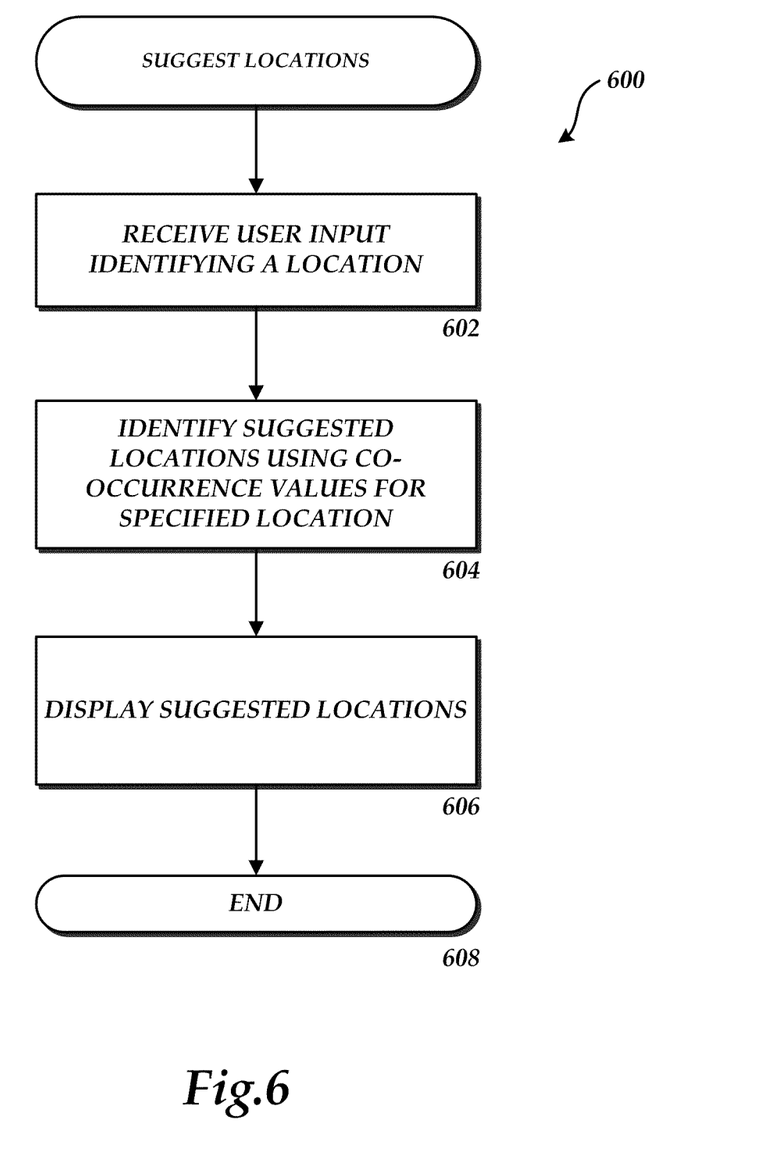
FIG. 6 is a flow diagram showing aspects of one process presented herein for suggesting one or more locations based upon co-occurrence values for locations identified in travelogues according to one embodiment presented herein.

Turning now to FIG. 6, a flow diagram showing aspects of one process presented herein for suggesting one or more locations based upon co-occurrence values for locations identified in travelogues will be described. In particular, FIG. 6 shows a routine 600 that illustrates aspects of the operation of the search Web site 112 executing on the server computer 104A.

The routine 600 begins at operation 602 where the search Web site 112 receives the identity of a specified location from a user of the client computer 102 by way of the Web browser 108. As discussed above, the identity of the specified location may come in the form of a request to the search Web site 112 to perform a search for information regarding the specified location. In response to receiving such a request, the routine 600 proceeds to operation 604, where the search Web site 112 identifies suggested locations for the location specified by the user.

According to one embodiment, the suggested locations are identified by the search Web site 112 utilizing the co-occurrence values 404 for the specified location. In particular, the co-occurrence values 404 are searched in order to identify those other locations having non-zero co-occurrence values with respect to the locations specified by the user. The other locations having non-zero co-occurrence values with respect to the specified location can then be displayed to the user by way of the Web browser 108 as suggested locations. In one embodiment, N locations having the highest co-occurrence values with respect to the identified location may be displayed. This occurs at operation 606. Once the suggested locations have been displayed to a user, the user may be permitted to select a graphical representation of the selected locations in order to find additional information regarding the selected location. From operation 606, the routine 600 proceeds to operation 608, where it ends.

Figure 7:
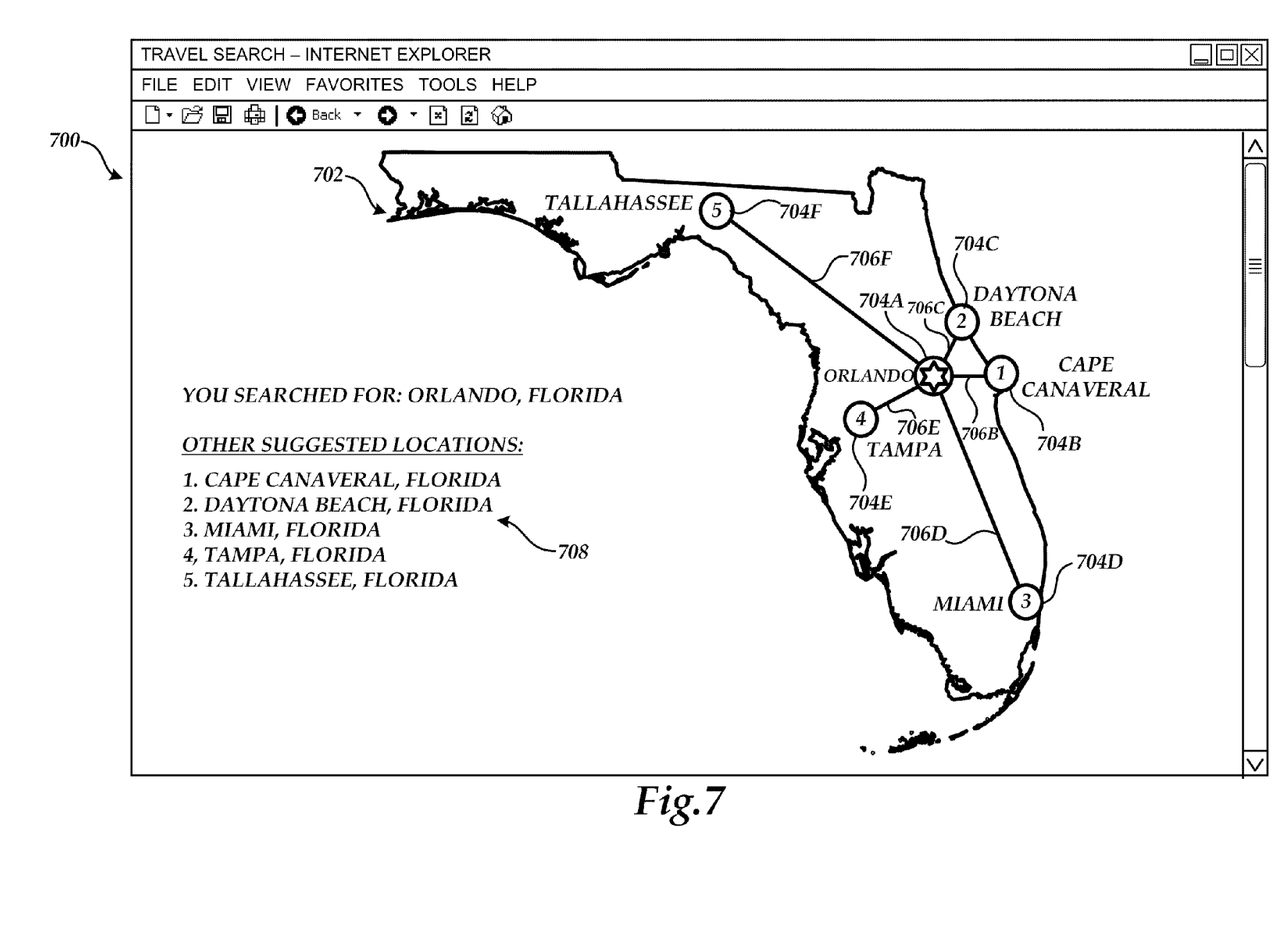
FIG. 7 is a screen display diagram showing an illustrative user interface provided by one embodiment disclosed herein for showing one or more suggested locations.

Referring now to FIG. 7, a screen display diagram showing an illustrative user interface provided by one embodiment disclosed herein for showing one or more suggested locations will be described. The user interface shown in FIG. 7 includes a window 700 generated by the Web browser 108 utilizing information received from the search Web site 112 following a search for information regarding "Orlando, Fla."

The window 700 includes a map 702 that encompasses a geographical area including the specified location, in this case Orlando, Fla., and the suggested locations identified by the search Web site 112. In the example shown in FIG. 7, the suggested locations identified by the search Web site 112 include Cape Canaveral, Daytona Beach, Miami, Tampa, and Tallahassee, Fla.

According to one embodiment, indicators 704A-704F are displayed on the map for the specified location and for each of the suggested locations. In the illustrative example shown in FIG. 7, an indicator 704A has been displayed on the map 702 corresponding to the specified location, Orlando, Fla. Additionally, indicators 704B-704F have been displayed on the map for the suggested locations identified by the search Web site 112. It should be appreciated that the indicators 704A-704F may comprise any type of graphical object that indicates the location of the specified or suggested locations on the map 702.

According to one embodiment, the indicator 704A for the specified location is displayed in a manner that distinguishes it from the indicators 704B-704F corresponding to the suggested locations. A list 708 may also be shown that lists the suggested locations in order of the corresponding co-occurrence value 404 associated with each suggested location. In this manner, locations that are mentioned more frequently in the travelogues 204 with the specified locations will appear sooner in the list 708.

In one embodiment, display attributes associated with the indicators 704B-704F may be modified based upon the co-occurrence value associated with the corresponding suggested location. For instance, the size, color, or other attribute of the indicators 704B-704F may be modified based upon the associated co-occurrence value. In this manner, those suggested locations that appear more frequently in travelogues with the specified location will be visually distinguishable from those suggested locations that appear with the specified location a fewer number of times.

According to another embodiment, the lines 706B-706F are displayed between the indicator 704A for the specified location and the indicators 704B-704F for the suggested locations. Attributes of the lines 706B-706F such as their thickness or style might also be modified based upon the co-occurrence value associated with the corresponding suggested location. It should be appreciated that other mechanisms might also be utilized to convey the co-occurrence values 404 for each of the suggested locations to a user of the client computer 102. It should also be appreciated that functionality might be provided in one embodiment through which a user can zoom into or out of the map 702. In response to such an action, additional or fewer suggested locations may be displayed within a portion of the map displayed within the window 700.

It should be appreciated that although the embodiments presented herein are described in the context of a client server implementation utilizing a search Web site 112 and a Web browser 108, the functionality presented herein may be implemented in other ways. For instance, according to one implementation, a standalone application program may be utilized to provide the functionality presented herein. Other single computer and multiple computer implementations will also be apparent to those skilled in the art.

Figure 8:
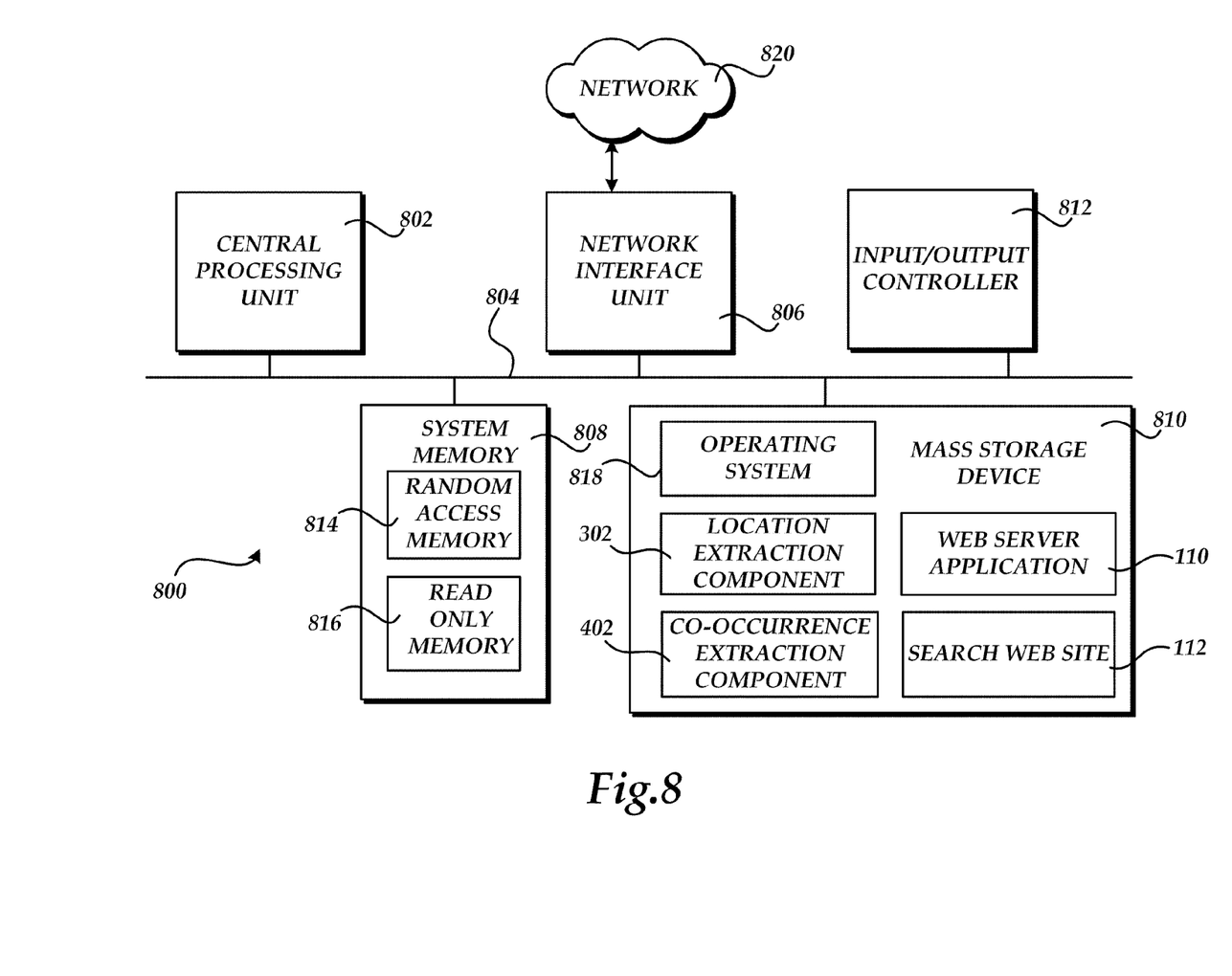
FIG. 8 is a computer architecture diagram showing an illustrative computer hardware and software architecture for a computing system capable of implementing aspects of the embodiments presented herein.

FIG. 8 shows an illustrative computer architecture for a computer 800 capable of executing the software components described herein for providing travelogue-based travel suggestions in the manner presented above. The computer architecture shown in FIG. 8 illustrates a conventional desktop, laptop, or server computer and may be utilized to execute any aspects of the software components presented herein.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8).

Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store the location extraction component 302, the co-occurrence extraction component 402, the Web server application 110, and the search Web site 112, each of which was described in detail above with respect to FIGS. 1-7. The mass storage device 810 and the RAM 814 may also store other types of program modules and data, including the travelogues 204, the locations 304, and the co-occurrence values 404.

It should be appreciated that the software components described herein may, when loaded into the CPU 802 and executed, transform the CPU 802 and the overall computer 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the computer 800 may comprise other types of computing devices, including hand-held computers, embedded computer systems, personal digital assistants, and other types of computing devices known to those skilled in the art. It is also contemplated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for travelogue-based travel suggestion are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for travelogue-based travel suggestions, the computer-implemented method comprising performing computer-implemented operations for:
    storing a plurality of text-based travelogues comprising text descriptions associated with particular locations;
    identifying a plurality of location descriptions each based on a text description within the plurality of text-based travelogues;
    computing co-occurrence values for pairs of the identified location descriptions, wherein each co-occurrence value comprises a value specifying the number of times a first identified location description and a second identified location description occur within a same text-based travelogue for all text-based travelogues within the plurality of text-based travelogues;
    receiving the identity of a specified location;
    identifying one or more suggested locations based on co-occurrence values for the pairs of the identified location descriptions associated with the specified location; and
    displaying data identifying the suggested locations.

2. The computer-implemented method of claim 1, wherein displaying data identifying the suggested locations comprises displaying a map encompassing the specified location and the suggestion locations and displaying an indicator on the map for the specified location and for each of the suggested locations.

3. The computer-implemented method of claim 2, wherein the indicator for each suggested location is sized according to the co-occurrence value associated with the suggested location.

4. The computer-implemented method of claim 2, wherein the indicator for each suggested location is colored according to the co-occurrence value associated with the suggested location.

5. The computer-implemented method of claim 2, further comprising displaying a line between the indicator for the specified location and the indicator for each suggested location.

6. The computer-implemented method of claim 5, wherein each line has a thickness and wherein the thickness is specified by the co-occurrence value for the associated suggested location.

7. The computer-implemented method of claim 5, wherein each line has style and wherein the style is specified by the co-occurrence value for the associated suggested location.

8. One of an optical disk, a magnetic storage device or a solid state storage device having computer-readable instructions stored thereupon which, when executed by a computer, cause the computer to:
   store one or more text-based travelogues comprising text descriptions associated with particular locations;
   execute a location extraction component to identify one or more location descriptions based on a text description of within the text-based travelogues;
   execute a co-occurrence extraction component to compute co-occurrence values for pairs of location descriptions identified within the text-based travelogues, wherein each co-occurrence value comprises a value specifying the number of times a first identified location description and a second identified location description are mentioned within a same text-based travelogue for all text-based travelogues within the set of text-based travelogues;
   receive the identity of a specified location;
   identify one or more suggested locations based on co-occurrence values for the pairs of the identified location descriptions associated with the specified location; and to
   cause data identifying the suggested locations to be displayed.

9. The optical disk, magnetic storage device or solid state storage device claim 8, wherein causing data identifying the suggested locations to be displayed comprises causing a map to be displayed that encompasses the specified location and the suggestion locations, causing an indicator to be displayed on the map corresponding to the specified location, and causing an indicator to be displayed on the map for each of the suggested locations.

10. The optical disk, magnetic storage device or solid state storage device of claim 9, wherein the indicator for each suggested location is sized according to the co-occurrence value associated with the suggested location.

11. The optical disk, magnetic storage device or solid state storage device of claim 10, wherein the indicator for each suggested location is colored according to the co-occurrence value associated with the suggested location.

12. The optical disk, magnetic storage device or solid state storage device of claim 11, wherein causing data identifying the suggested locations to be displayed further comprises causing a line to be displayed between the indicator for the specified location and the indicator for each suggested location.

13. The optical disk, magnetic storage device or solid state storage device of claim 12, wherein each line has a thickness and wherein the thickness is specified by the co-occurrence value for the associated suggested location.

14. The optical disk, magnetic storage device or solid state storage device of claim 13, wherein each line has style and wherein the style is specified by the co-occurrence value for the associated suggested location.

15. A computer-implemented method for travelogue-based travel suggestions, the computer-implemented method comprising performing computer-implemented operations for:
   storing one or more text-based travelogues, each of the text-based travelogues comprising a text description associated with a location;
   executing a location extraction component configured to identify one or more location descriptions based on the text description with the location within the text-based travelogues;
   executing a co-occurrence extraction component configured to compute co-occurrence values for pairs of location descriptions identified within the text-based travelogues, each of the co-occurrence values comprising a value specifying the number of times a pair of identified location descriptions are mentioned within a same text-based travelogue for all of the text-based travelogues;
   receiving the identity of a specified location;
   identifying one or more suggested locations based on co-occurrence values for the pairs of the identified location descriptions associated with the specified location; and
   causing a map to be displayed that encompasses the specified location and the suggestion locations, causing an indicator to be displayed on the map corresponding to the specified location, and causing indicators to be displayed on the map for the suggested locations.

* * * * *